(12) United States Patent
Large

(10) Patent No.: US 8,583,442 B2
(45) Date of Patent: *Nov. 12, 2013

(54) RHYTHM PROCESSING AND FREQUENCY TRACKING IN GRADIENT FREQUENCY NONLINEAR OSCILLATOR NETWORKS

(75) Inventor: Edward W. Large, Boca Raton, FL (US)

(73) Assignees: Circular Logic, LLC, Philadelphia, PA (US); Florida Atlantic University Research Corporation, Boca Raton, FL (US)

( * ) Notice: Subject to any disclaimer, the term of this patent is extended or adjusted under 35 U.S.C. 154(b) by 64 days.

This patent is subject to a terminal disclaimer.

(21) Appl. No.: 13/016,602

(22) Filed: Jan. 28, 2011

(65) Prior Publication Data

US 2011/0202348 A1    Aug. 18, 2011

Related U.S. Application Data

(60) Provisional application No. 61/299,768, filed on Jan. 29, 2010.

(51) Int. Cl.
    *G10L 21/00*      (2013.01)

(52) U.S. Cl.
    USPC ........... 704/270; 704/267; 704/268; 704/269

(58) Field of Classification Search
    USPC .................................. 704/267–270
    See application file for complete search history.

(56) References Cited

U.S. PATENT DOCUMENTS

| | | | |
|---|---|---|---|
| 7,840,508 B2 * | 11/2010 | Yoshiike et al. ............... 706/25 | |
| 2005/0234366 A1 | 10/2005 | Heinz et al. | |
| 2005/0283360 A1 | 12/2005 | Large | |
| 2007/0005348 A1 | 1/2007 | Klefenz | |
| 2008/0091393 A1 * | 4/2008 | Gustafsson ................. 703/5 |

OTHER PUBLICATIONS

International Search Report of PCT/US2011/22993.

* cited by examiner

*Primary Examiner* — Leonard Saint Cyr
(74) *Attorney, Agent, or Firm* — Edwards Wildman Palmer LLP; Howard M. Gitten

(57) ABSTRACT

A method for mimicking the auditory system's response to rhythm of an input signal having a time varying structure comprising the steps of receiving a time varying input signal x(t) to a network of n nonlinear oscillators, each oscillator having a different natural frequency of oscillation and obeying a dynamical equation of the form $$\dot{r} = r\left(\alpha + \beta_1|z|^2 + \epsilon\frac{\beta_2|z|^4}{1-\epsilon|z|^2}\right) + cx(t)\frac{\cos\phi - r\sqrt{\epsilon}}{\epsilon r^2 - 2\sqrt{\epsilon}\, r\cos\phi + 1}$$

$$\dot{\phi} = \omega + \delta_1 r^2 + \epsilon\frac{\delta_2 r^4}{1-\epsilon r^2} - cx(t)\frac{\sin(\phi)}{\epsilon r^2 - 2\sqrt{\epsilon}\, r\cos(\phi) + 1}$$

$$\dot{\omega} = -kx(t)\frac{\sin\phi}{\epsilon r^2 - 2\sqrt{\epsilon}\, r\cos\phi + 1}$$

wherein $\omega$ represents the response frequency, r is the amplitude of the oscillator and $\phi$ is the phase of the oscillator. Generating at least one frequency output from said network useful for describing said varying structure.

3 Claims, 8 Drawing Sheets

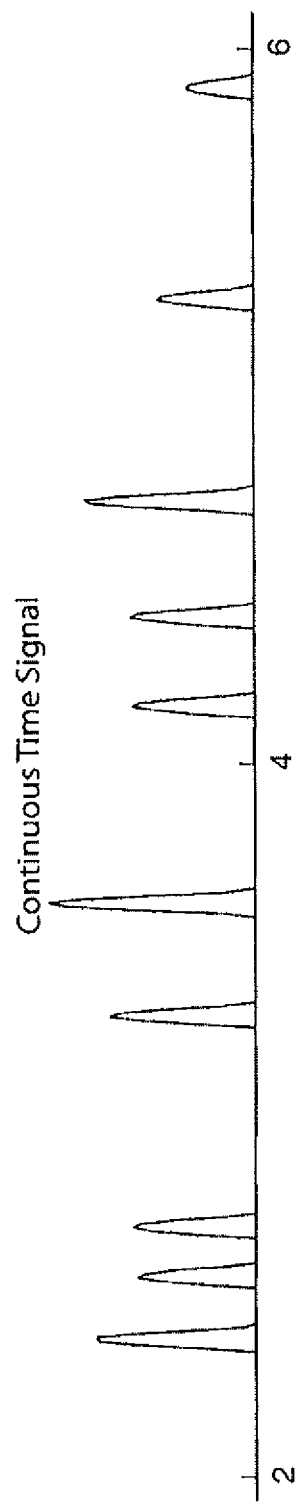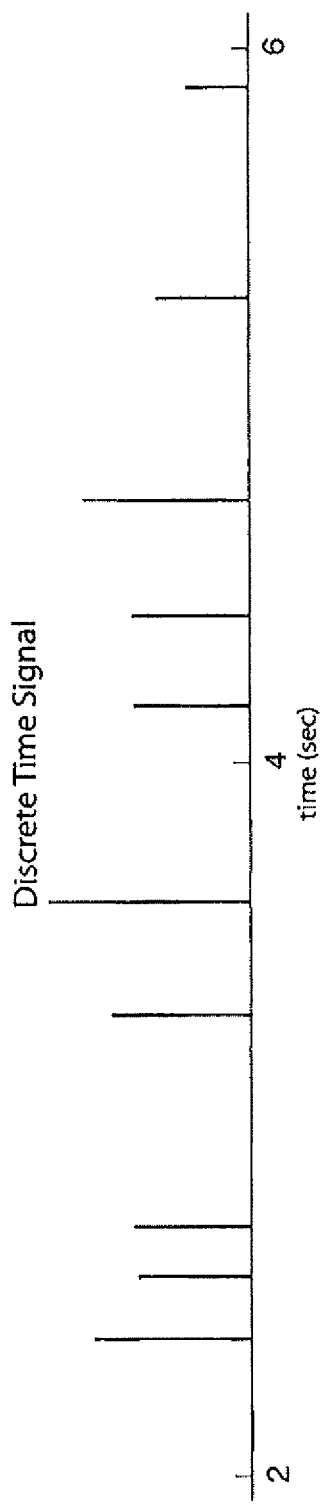
FIG. 3A
FIG. 3B

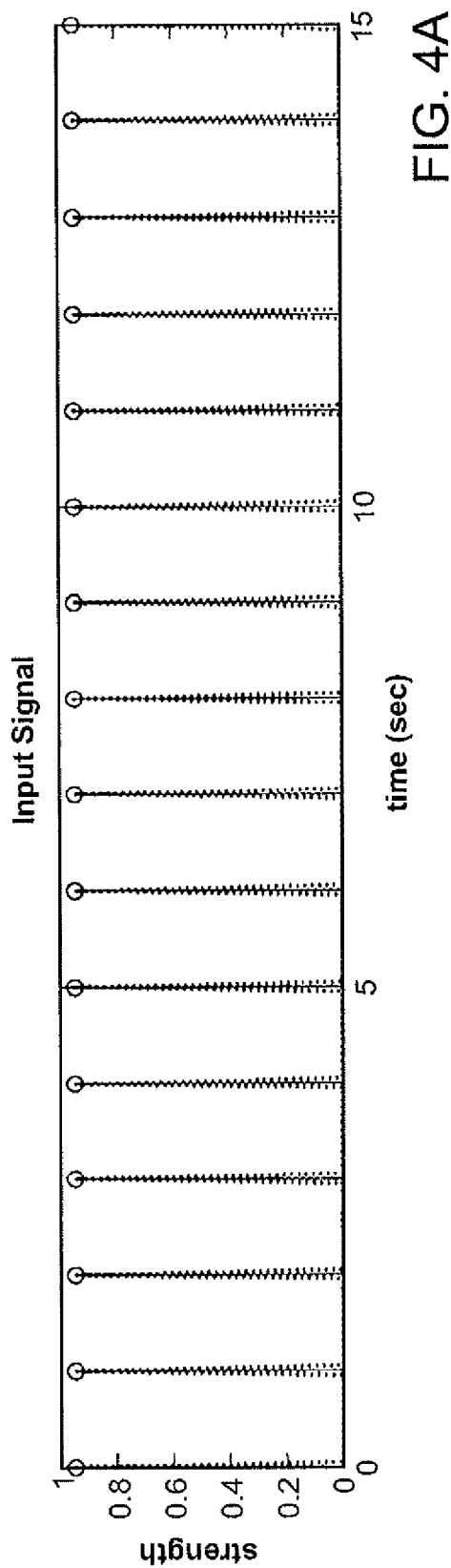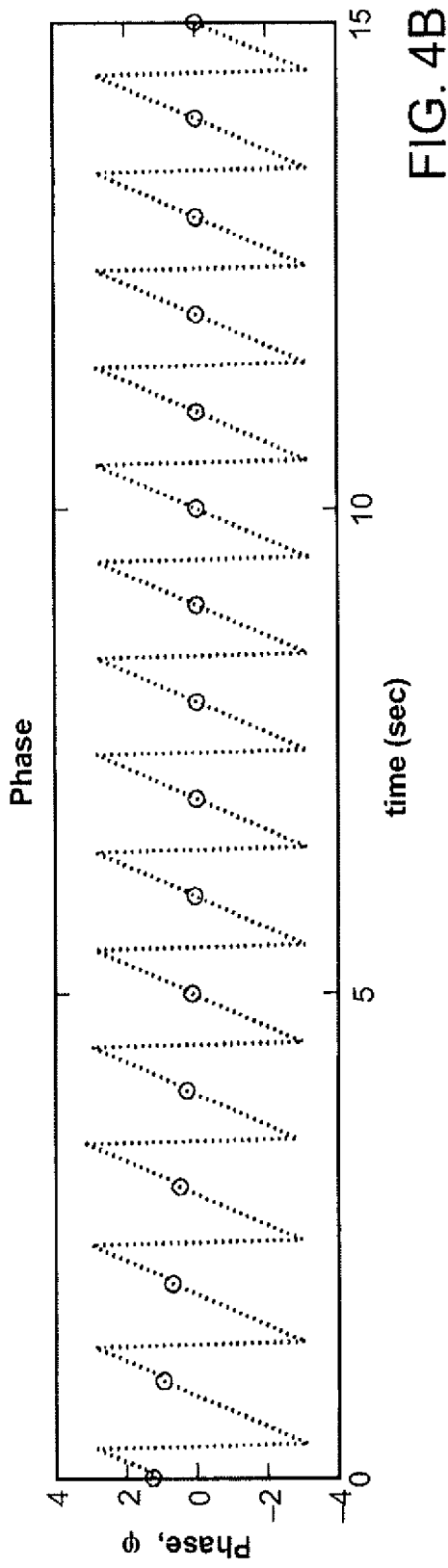

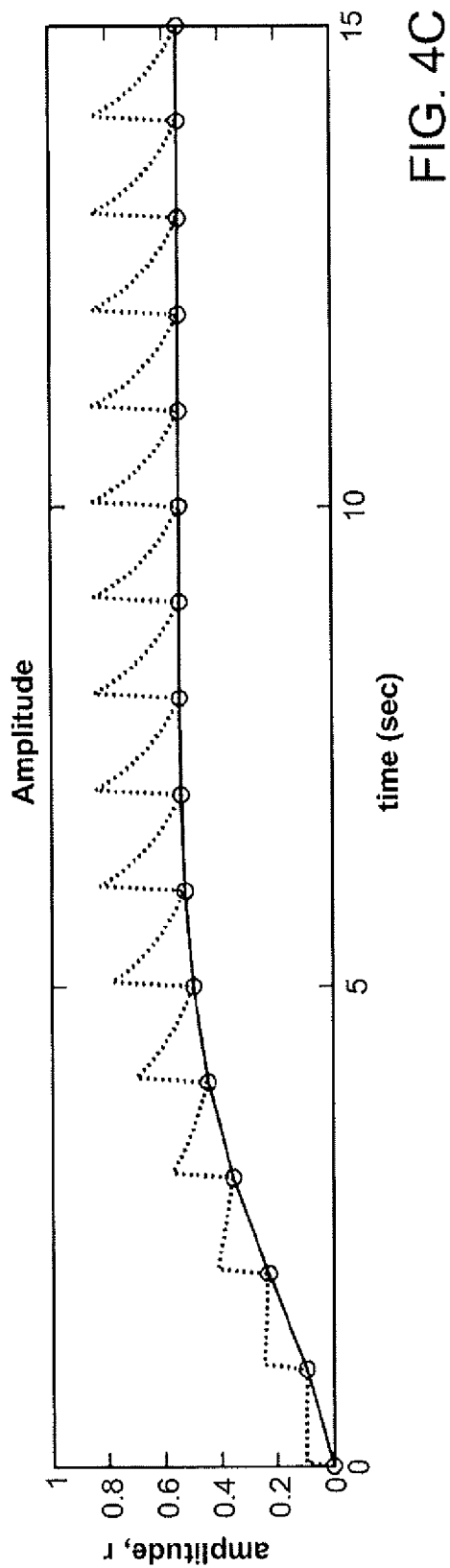

US 8,583,442 B2

RHYTHM PROCESSING AND FREQUENCY TRACKING IN GRADIENT FREQUENCY NONLINEAR OSCILLATOR NETWORKS

CROSS REFERENCE TO RELATED APPLICATIONS

This application claims priority to U.S. provisional application No. 61/299,766 filed on Jan. 29, 2010 in its entirety.

FEDERALLY SPONSORED RESEARCH OR DEVELOPMENT

The United States Government has rights in this invention pursuant to Contract No. FA9550-07-00095 between Air Force Office of Scientific Research and Circular Logic, LLC and Contract No. FA9550-07-C-0017 between Air Force Office of Scientific Research and Circular Logic, LLC.

BACKGROUND OF THE INVENTION

This invention is directed to the perception and recognition of audio signal inputs and, more particularly, to a signal processing method and apparatus for providing a nonlinear frequency analysis of temporally structured signals in a manner which more closely mimics the operation of the human brain.

The use of an array of nonlinear oscillators to process input audio signal is known in the art from U.S. Pat. No. 7,376,562 granted to Edward W. Large (Large).

It is generally known from Large to process signals using networks of nonlinear oscillators. Nonlinear resonance provides a wide variety of behaviors that are not observed in linear resonance (e.g. neural oscillations). Moreover, as in nature, oscillators can be connected into complex networks. FIG. 1 shows a typical architecture used to process acoustic signals. It consists of a network 100 of layers of one-dimensional arrays of nonlinear oscillators, called gradient-frequency nonlinear oscillator networks (GFNNs). In FIG. 1, GFNNs are arranged into processing layers to simulate auditory processing by two different brain areas (102) at Layer 1 (the input layer) and (104) at Layer 2.

More specifically, as illustrated in FIG. 2, an exemplary nonlinear oscillator system is comprised of a network 402 of nonlinear oscillators $405_1$, $405_2$, $405_3$ ... $405_N$. An input stimulus layer 401 can communicate an input signal to the network 402 through a set of the stimulus connections 403. In this regard, the input stimulus layer 401 can include one or more input channels $406_1$, $406_2$, $406_3$ ... $406_C$. The input channels can include a single channel of multi-frequency input, two or more channels of multi-frequency input.

Assuming C input channels as shown in FIG. 2, then the stimulus on channel $406_C$ at time t is denoted $x_C(t)$, and the matrix of stimulus connections 403 may be analyzed as strength of a connection from an input channel $406_C$ to an oscillator $405_N$, for a specific resonance, as known from Large. Notably, the connection matrix can be selected so that the strength of one or more of these stimulus connections is equal to zero.

As known from Large, signal processing by networks of nonlinear oscillators can be performed to broadly mimic the brain's response. This is similar to signal processing by a bank of linear filters, but with the important difference that the processing units are nonlinear, rather than linear oscillators. In this section, this approach is explained by comparing it with linear time-frequency analysis.

A common signal processing operation is frequency decomposition of a complex input signal, for example by a Fourier transform. Often this operation is accomplished via a bank of linear bandpass filters processing an input signal, x(t). For example, a widely used model of the cochlea is a gammatone filter bank (Patterson, et al., 1992). For comparison with our model a generalization can be written as a differential equation $$\dot{z} = z(\alpha + i\omega) + x(t) \quad (1)$$

where the overdot denotes differentiation with respect to time (i.e., dz/dt), z is a complex-valued state variable, ω, is radian frequency (ω=2πf, f in Hz), α<0 is a linear damping parameter. The term, x(t), denotes linear forcing by a time-varying external signal. Because z is a complex number at every time, t, it can be rewritten in polar coordinates revealing system behavior in terms of amplitude, r, and phase, φ. Resonance in a linear system means that the system oscillates at the frequency of stimulation, with amplitude and phase determined by system parameters. As stimulus frequency, $\omega_0$, approaches the oscillator frequency, ω, oscillator amplitude, r, increases, providing band-pass filtering behavior.

Recently, nonlinear models of the cochlea have been proposed to simulate the nonlinear responses of outer hair cells. It is important to note that outer hair cells are thought to be responsible for the cochlea's extreme sensitivity to soft sounds, excellent frequency selectivity and amplitude compression (e.g., Egulluz, Ospeck, Choe, Hudspeth, & Magnasco, 2000). Models of nonlinear resonance that explain these properties have been based on the Hopf normal form for nonlinear oscillation, and are generic. Normal form (truncated) models have the form $$\dot{z} = z(\alpha + i\omega + \beta|z|^2) + x(t) + h.o.t. \quad (2)$$

Note the surface similarities between this form and the linear oscillator of Equation 1. Again ω is radian frequency, and α is still a linear damping parameter. However in this nonlinear formulation, α becomes a bifurcation parameter which can assume both positive and negative values, as well as α=0. The value α=0 is termed a bifurcation point. β<0 is a nonlinear damping parameter, which prevents amplitude from blowing up when α>0. Again, x(t) denotes linear forcing by an external signal. The term h.o.t. denotes higher-order terms of the nonlinear expansion that are truncated (i.e., ignored) in normal form models. Like linear oscillators, nonlinear oscillators come to resonate with the frequency of an auditory stimulus; consequently, they offer a sort of filtering behavior in that they respond maximally to stimuli near their own frequency. However, there are important differences in that nonlinear models address behaviors that linear ones do not, such as extreme sensitivity to weak signals, amplitude compression and high frequency selectivity. The compressive gammachirp filterbank exhibits similar nonlinear behaviors, to Equation 2, but is formulated within a signal processing framework (Irino & Patterson, 2006).

Large taught expanding the higher order terms of Equation 2 to enable coupling among oscillators of different frequencies. This enables efficient computation of gradient frequency networks of nonlinear oscillators, representing an improvement to the technology. As known from applicant's copending application Ser. No. 13/016,713, the canonical model (Equation 3) is related to the normal form (Equation 2; see e.g., Hoppensteadt & Izhikevich, 1997), but it has properties beyond those of Hopf normal form models because the underlying, more realistic oscillator model is fully expanded, rather than truncated. The complete expansion of higher-order terms produces a model of the form $$\dot{z} = z\left(\alpha + i\omega + (\beta_1 + i\delta_1)|z|^2 + \epsilon\frac{(\beta_2 + i\delta_2)|z|^4}{1 - \epsilon|z|^2}\right) + c\mathcal{P}(\epsilon, x(t)), \mathcal{A}(\epsilon, \bar{z}) \quad (3)$$

There are again surface similarities with the previous models. The parameters, $\omega$, $\alpha$ and $\beta_1$ correspond to the parameters of the truncated model. $\beta_2$ is an additional amplitude compression parameter, and c represents strength of coupling to the external stimulus. Two frequency detuning parameters $\delta_1$ and $\delta_2$ are new in this formulation, and make oscillator frequency dependent upon amplitude. The parameter E controls the amount of nonlinearity in the system. Most importantly, coupling to a stimulus is nonlinear and has a passive part, $P(\epsilon,x(t))$ and an active part, $A(\epsilon, \bar{z})$, producing nonlinear resonances.

Equation 3 above is generally stated in terms of x(t) wherein x(t) is the input audio source signal. However, in the human brain, neural oscillators experience sound not only from the exterior environment, but signals input from other oscillators either across the array layer or between layers of array, which would include feedback as shown in FIG. 1*a* between oscillator layers, inputs from oscillator layers both above and below the subject oscillator, and the like. Equation 3 accounts for these different inputs, but for ease of explanation, utilizes a generic x(t).

The Large method and system for the behavior of a network of nonlinear oscillator better mimics the complexity of the ear response to complex audio signals than the prior art linear models. However, it suffers from the disadvantage that it does not include a method for tracking changes in frequency of an input signal. Moreover, digital implementations of this system require significant computation which may limit applications that require real-time operation.

SUMMARY OF THE INVENTION

A method by which to compute the response of a network of oscillators to an impulsive input signal, such as a sequence of onset impulses representing a musical rhythm, is provided. A method by which to track the changing frequency of an input signal, such as the changing tempo of a musical rhythm is provided. A method by which to compute the response of a network of oscillators, and to track the changing frequency, of a discrete time impulsive input signal is provided.

BRIEF DESCRIPTION OF THE DRAWINGS

Other objects, features and advantages of the present invention will be apparent from the written description and the drawings in which:

FIGS. 3A-B are graphic representations of an impulsive input signal and a discrete time approximation of an impulsive input signal;

FIGS. 4A-C are graphical representations of the input and output of a nonlinear oscillator computed in discrete time, compared with the output of a nonlinear oscillator computed in continuous time, in accordance with the invention;

DETAILED DESCRIPTION OF THE PREFERRED EMBODIMENTS

Figure 1A:
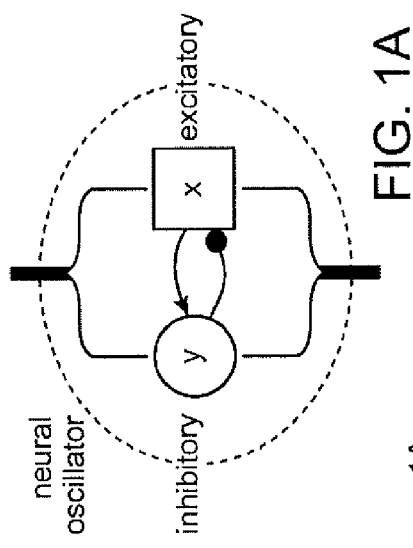
FIG. 1*a* is a schematic representation of the analogous neuron oscillator response for a nonlinear oscillator.
Figure 1:
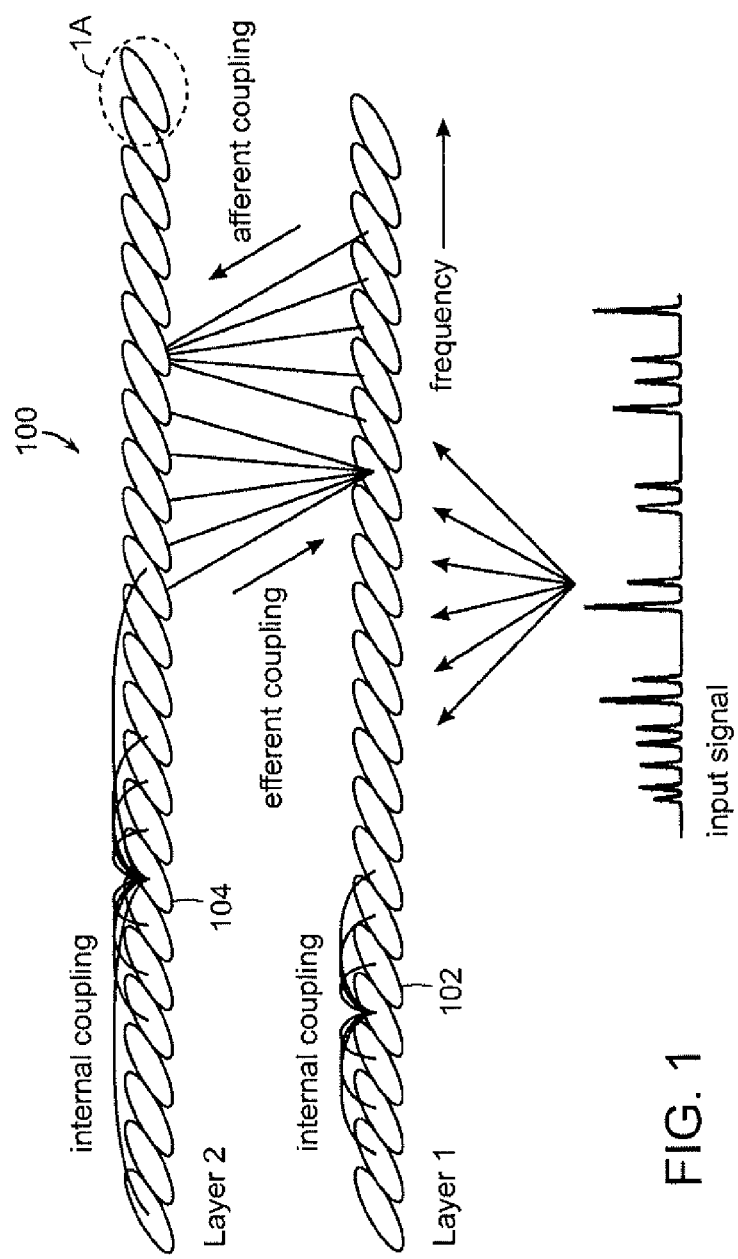
FIG. 1 is a diagram illustrating the basic structure of a nonlinear neural network.
Figure 2:
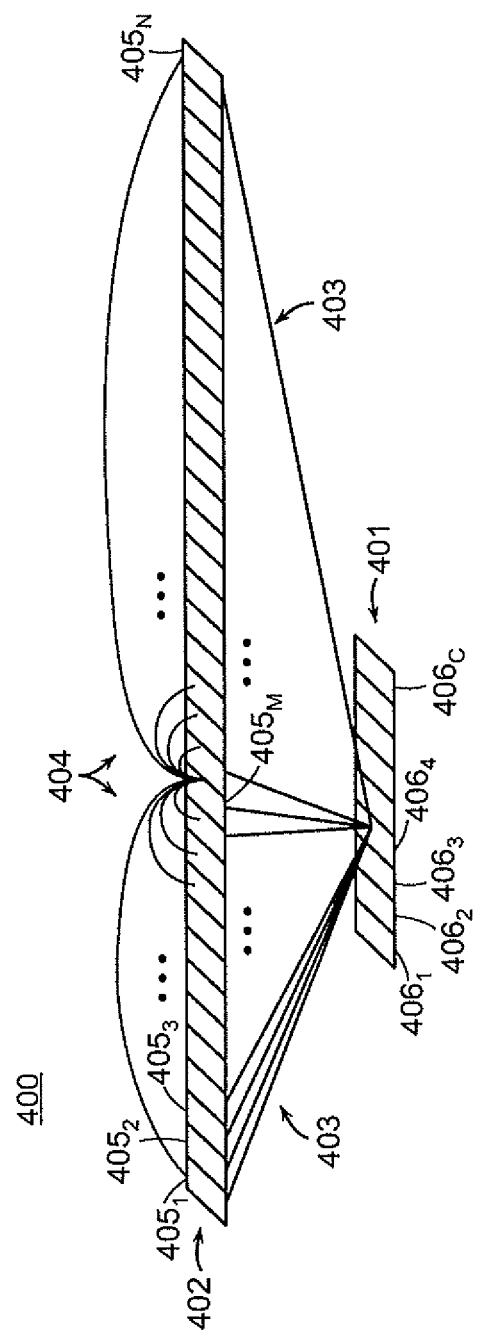
FIG. 2 is a further diagram illustrating the basic structure of a nonlinear network and its relation to the input signal in accordance with the invention.

The objective of this invention is to apply nonlinear signal processing to temporal human-computer interactions for computer music and music recognition. Rhythmic complexity and temporal expressivity are natural aspects of solo musical performance and human rhythmic interaction. However, current technological approaches cannot properly interpret human rhythm, and computers cannot rhythmically coordinate with humans. The current state of the art in computer rhythm analysis limits musical creativity and can make musical communication with computers awkward and frustrating.

An advantage of the canonical model described above is that the state variable, z, is complex—possessing both amplitude and a phase. Previous entrainment models of rhythm utilized only phase dynamics, limiting system capabilities. With amplitude dynamics, it becomes possible to determine which oscillators are responding best to the input signal at any specific point in time.

Equation 3 can be rewritten in terms of amplitude and phase. The input stimulus, x(t), consists of impulses representing the onsets of musical events (e.g. notes), as shown in FIG. 3A. We also observe that the passive nonlinearity, $P(\epsilon,x)$ does not change the nature of an impulsive input signal, so we neglect the passive nonlinearity in this derivation. We further note that the definition of the active nonlinearity is $$\mathcal{A}(\epsilon, \bar{z}) = \frac{1}{1 - \sqrt{\epsilon}\,\bar{z}}.$$

Therefore, we write:

$$\dot{r} = r\left(\alpha + \beta_1|z|^2 + \epsilon\frac{\beta_2|z|^4}{1 - \epsilon|z|^2}\right) + cx(t)\frac{\cos\phi - r\sqrt{\epsilon}}{\epsilon r^2 - 2\sqrt{\epsilon}\,r\cos\phi + 1} \quad (4)$$

$$\dot{\phi} = \omega + \delta_1 r^2 + \epsilon\frac{\delta_2 r^4}{1 - \epsilon r^2} - cx(t)\frac{\sin(\phi)}{\epsilon r^2 - 2\sqrt{\epsilon}\,r\cos(\phi) + 1}$$

where r is the amplitude of the oscillator, and $\phi$ is the phase of the oscillator, and the parameters are defined above. Due to the impulsive nature of the stimulus, in implementation it is necessary to enforce the condition $0 \leq r < 1/\sqrt{\epsilon}$ at each time step.

FIG. 4 shows the response of this system to a purely impulsive input rhythm, presented as a continuous time series. The input pulses are shown FIG. 4A (dotted lines, strength is divided by dt). FIG. 4B shows the phase, $\phi$, of the oscillator (dotted lines) and FIG. 4C shows the amplitude, r, of the oscillator (dotted lines).

Adaptation to smooth tempo change is accomplished via adaptation of a frequency parameter. In previous models of tempo tracking by adaptive oscillators, a single oscillator with adaptive period was used successfully, with certain limitations. The current method estimates frequency (inverse of period) directly, providing more stable behavior. It also enables every oscillator in the network to provide an estimate of how frequency should change. Estimates are weighted by amplitude, and combined to form a global estimate of how the input signal's frequency ω is changing. The entire network contributes to the estimate of tempo, providing greatly improved performance.

$$\dot{\omega} = -kx(t)\frac{\sin\phi}{\epsilon r^2 - 2\sqrt{\epsilon}\, r\cos\phi + 1} \quad (5)$$

Figure 6A:
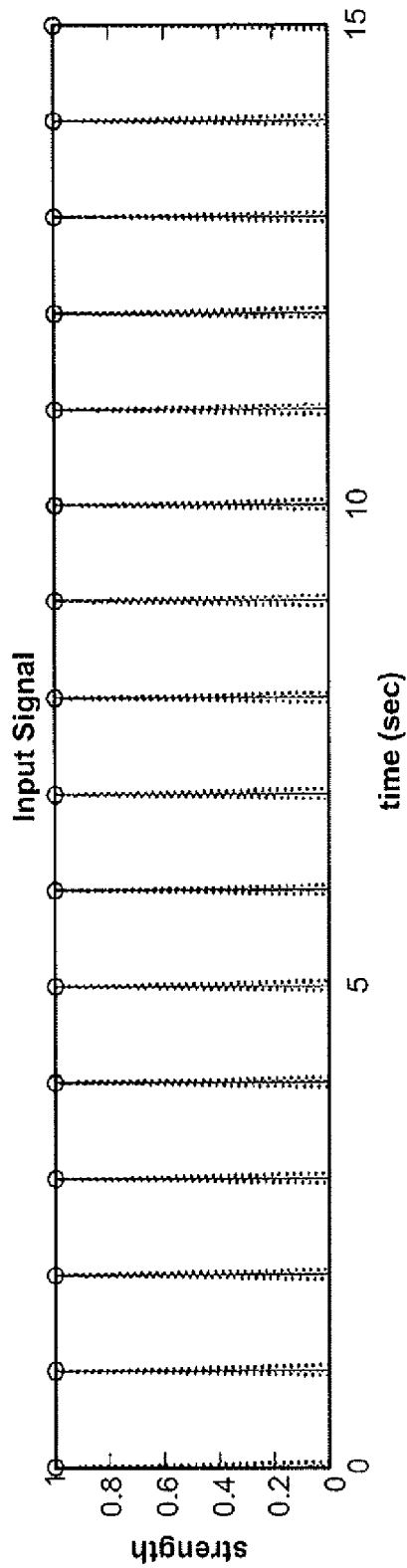
FIG. 6A-D are a graphical representations of the input and output of a nonlinear oscillator computed in discrete time, compared with the output of a nonlinear oscillator computed in continuous time, in accordance with the invention.
Figure 6B:
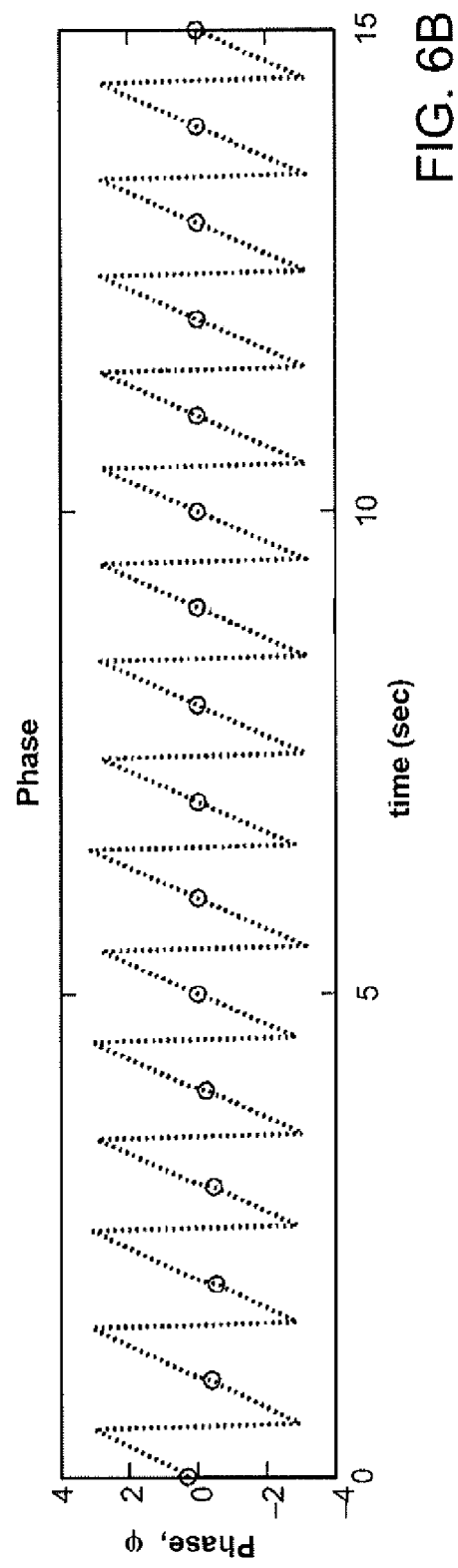
Figure 6C:
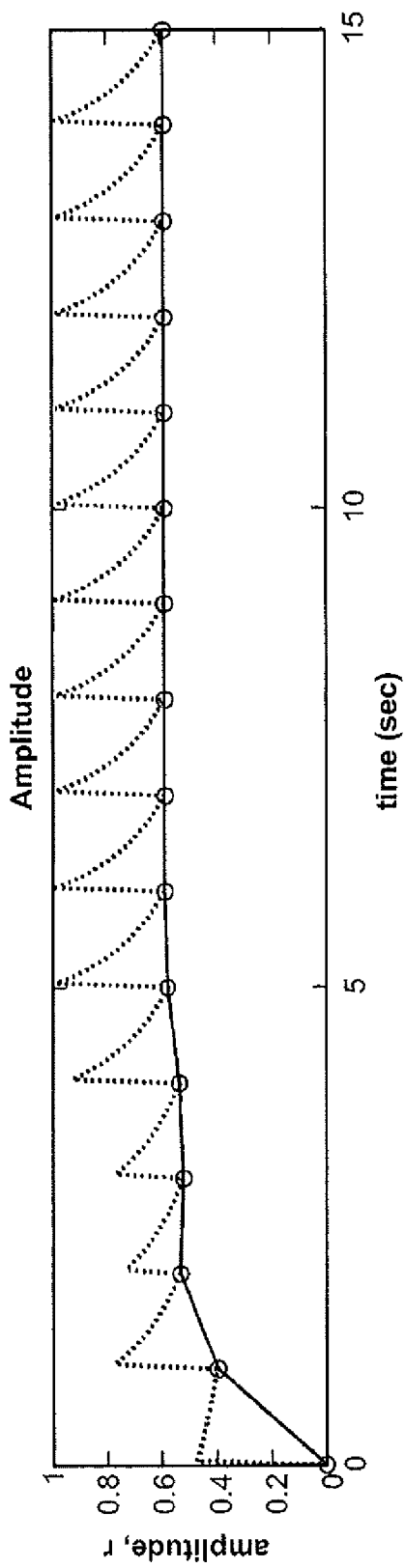
Figure 6D:
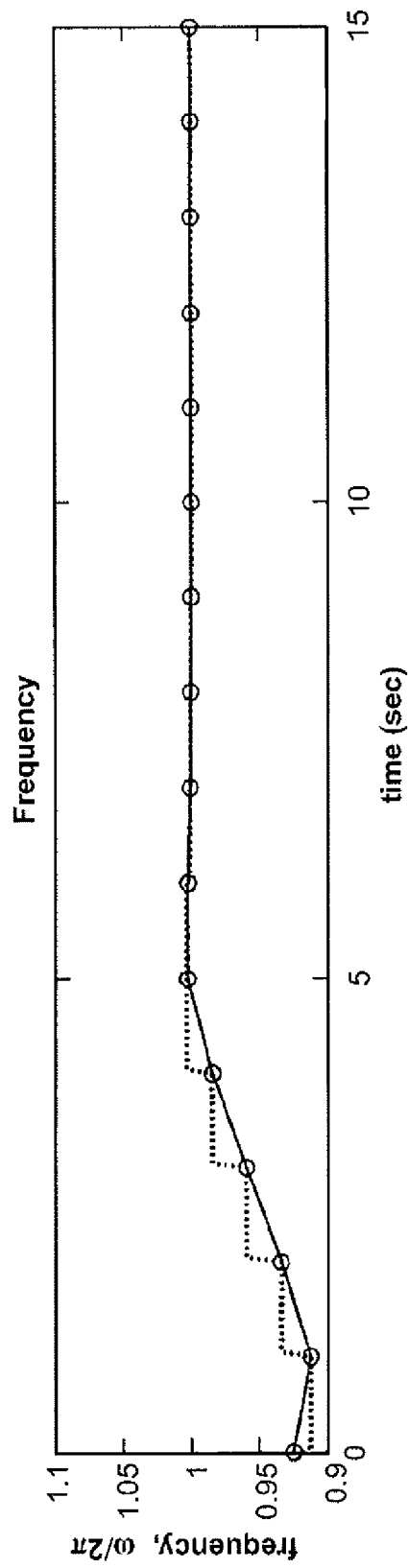

Equations 4 and 5 provide a method for analysis of rhythm input to the system as a continuous time series, as is illustrated in FIGS. 3A, 4A and 6A. FIG. 6 shows the response of this system to a purely impulsive input rhythm, presented as a continuous time series, having a different frequency than the oscillator. The input pulses are shown in FIG. 6A (dotted lines, amplitude is divided by dt). FIG. 6B shows the phase, φ, of the oscillator (dotted lines) and FIG. 6C shows the amplitude, r, of the oscillator (dotted lines). FIG. 6D shows the changing frequency, f=ω/2π, of the oscillator, illustrating how it comes to match the input frequency, $f_{input}$=1 Hz.

Utilizing a network of nonlinear oscillators which behave in accordance with Equations 4 and 5, a system which mimics the human response to rhythm is provided. As a result, utilizing these equations, the network of nonlinear oscillators may operate on any rhythmic input consisting of onset impulses, and track a changing frequency.

Because a rhythm is input to the system as a series of onset impulses, as shown in FIG. 3A, and because these impulses can be approximated as a sequence of discrete events, as shown in FIG. 3B, it is possible to compute the state of an oscillator at only those time points that correspond to discrete input events. This enables faster computation for impulsive input sequences, when a discrete approximation is appropriate. Formally, this means that we assume x(t)=s(t) δ(t), where δ(t) is the Dirac delta function. To arrive at this form, it is necessary to integrate the differential equations (4), solving for oscillator amplitude, r, phase, φ, as a function of time. The solutions are then used to compute oscillator amplitude and phase at the time of the next input impulse. The input is taken into account as part of the initial condition. A new initial condition is computed by adding the nonlinear coupling term to the initial condition using the input impulse, and the process iterates until the end of the input sequence.

When $\beta_2$=0, it is possible to find solutions for the amplitude equation. The specific form of the solution depends on the value of oscillator parameters. Here we show the case when α=0 and $\beta_1$<0. For simplicity of explication, we assume that $\delta_1=\delta_2$=0. However, because the points of time of interest are those at which the input occurs, other embodiments include any discrete equation derived from Equation 4 that provides the solutions to Equation 4 at the times at which those events occur. This gives the finite difference equations:

$$r_{n+1} = \frac{1}{\sqrt{-2k_n - 2t\beta}},$$

$$\text{where } k_n = -\frac{1}{2\left(r_n + cs_n \frac{\cos\phi_n - r_n\sqrt{\epsilon}}{\epsilon r_n^2 - 2\sqrt{\epsilon}\, r_n\cos\phi_n + 1}\right)^2},$$

-continued $$\text{and } \phi_{n+1} = \phi_n + \omega T_{n+1} - cs_n\frac{\sin\phi_n}{\epsilon r_n^2 - 2\sqrt{\epsilon}\, r_n\cos\phi_n + 1}$$

Wherein n denotes the $n^{th}$ input impulse, $s_n$, is the strength and $t_n$ is the time of the $n^{th}$ event, and $T_{n+1}$ is the time interval between $t_n$ and $t_{n+1}$. The variables $r_n$ and $\phi_n$ represent the amplitude and phase, respectively, of the oscillator just before the $n^{th}$ input impulse. Due to the way the nonlinear coupling grows, and the properties of finite difference equations, it is advantageous to normalize the maximum value to one of the coupling terms. This is accomplished by multiplying the coupling terms by 1-√εr. This gives us the normalized discrete version:

$$r_{n+1} = \frac{1}{\sqrt{-2k_n - 2t\beta}}, \quad (6)$$

$$\text{where } k_n = -\frac{1}{2\left(r_n + cs_n \frac{(1 - \sqrt{\epsilon}\, r_n)(\cos\phi_n - r_n\sqrt{\epsilon})}{\epsilon r_n^2 - 2\sqrt{\epsilon}\, r_n\cos\phi_n + 1}\right)^2}$$

$$\phi_{n+1} = \phi_n + \omega T_{n+1} - cs_n\frac{(1 - \sqrt{\epsilon}\, r_n)\sin\phi_n}{\epsilon r_n^2 - 2\sqrt{\epsilon}\, r_n\cos\phi_n + 1}$$

Due to the impulsive nature of the stimulus, in implementation it is necessary to enforce the condition 0≤r<1/√ε at each time step in Equations 5 and 6.

FIG. 4 shows the response of this system (Equation 6) to an impulsive input rhythm, presented as a discrete time series, and compares the result to the continuous time version. The discrete input pulses are shown FIG. 4A (solid lines with circles on top). FIG. 4B shows the phase, $\phi_n$, of the oscillator at the discrete time points, n, of the computation (circles) and FIG. 4C shows the amplitude, $r_n$, of the oscillator at the discrete time points of the computation (circles), and also connects these with a solid line. Note that at the discrete time points of the computation, the result matches the result of the continuous time system (dotted lines).

Figure 5:
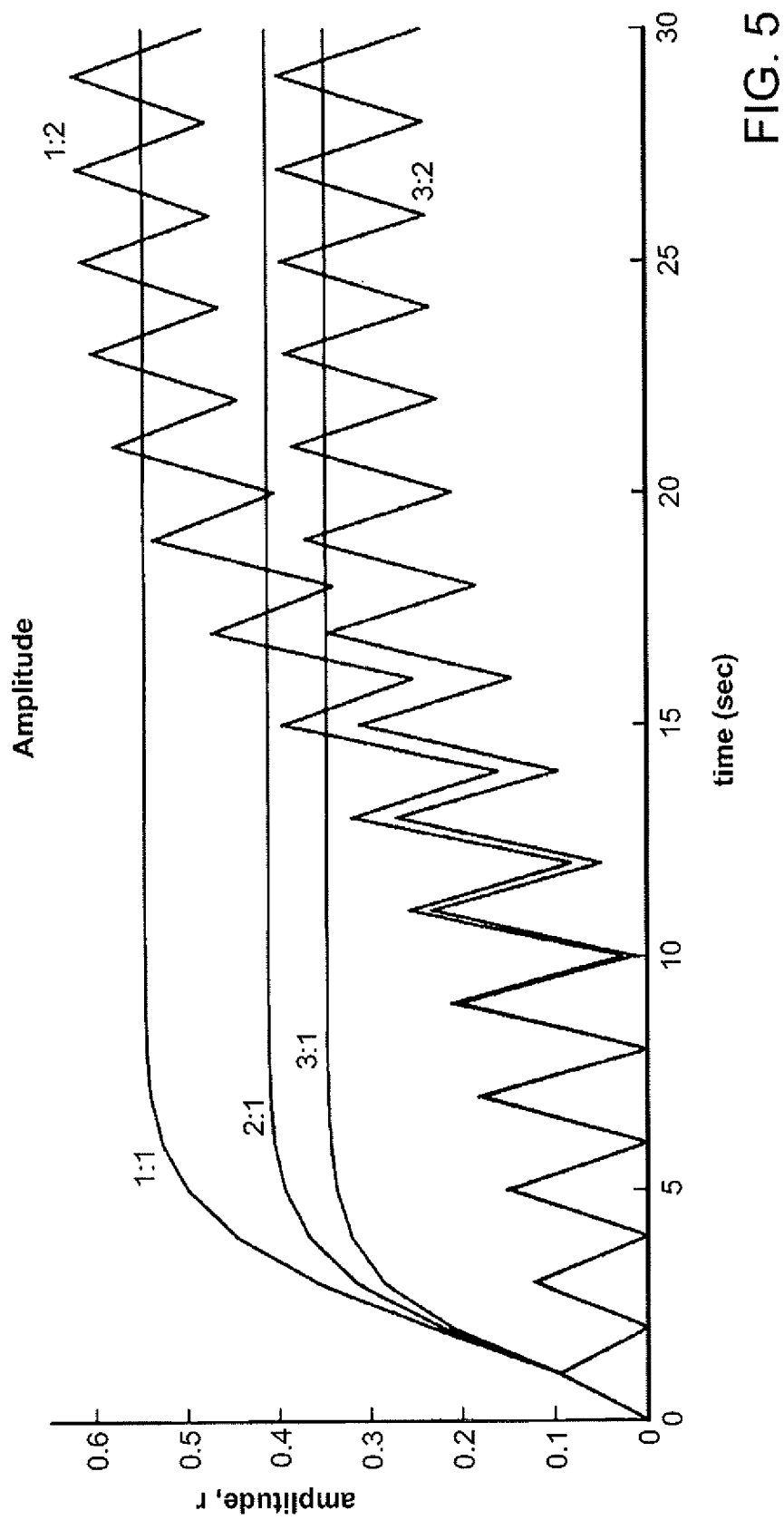
FIG. 5 is a graphical representation of oscillator output amplitude for five different oscillator frequencies in response to an impulsive input signal.

FIG. 5 shows the amplitude response of five different oscillators that have different frequency ratios with the input frequency (oscillator frequency:input frequency=1:1, 2:1, 3:1, 1:2 and 3:2). This shows that the discrete time system responds appropriately at higher order resonances, an important feature of nonlinear oscillator networks, as described in Large, and in copending application Ser. No. 13/016,713.

Once this transformation has been accomplished, the phase variable, φ, represents relative phase, the phase of the oscillator when an input event occurs (cf. Pikovsky, Rosenblum, & Kurths, 2001). This equation can also be transformed to produce discrete times at which events are expected, tx, in the input stream modeling perceived musical beats. This is accomplished by observing that phase is related to time by the relation φ=2πft, and transforming the phase equation to $$tx_{n+1} = tx_n + T_{n+1} - \frac{cs_n}{2\pi f}\frac{(1 - \sqrt{\epsilon}\, r_n)\sin\phi_n}{\epsilon r_n^2 - 2\sqrt{\epsilon}\, r_n\cos\phi_n + 1} \quad (7)$$

In implementation it is advantageous to update expected event time, tx, according to tx=tx+1/f when t≥tx, where t is real time. Thus expected event time (tx) keeps pace with real time, and allows the system to output perceived musical beats.

Frequency dynamics (Equation 5) can also be written as a discrete time equation.

$$\omega_{n+1} = \omega_n - ks_n \frac{(1 - \sqrt{\epsilon r_n})\sin\phi_n}{\epsilon r_n^2 - 2\sqrt{\epsilon}\, r_n\cos\phi_n + 1} \qquad (8)$$

The discrete time model is simple, but powerful. This method allows us to work directly with discrete time event based inputs, such as MIDI, and provides fast implementation for real-time operation.

FIG. 6 shows the response of this system (Equations 6 and 8) to an impulsive input rhythm, presented as a discrete time series, and compares the result to the continuous time version. The discrete input pulses are shown FIG. 6A (solid lines with circles on top). FIG. 6B shows the phase, $\phi$, of the oscillator at the discrete time points of the computation (circles) and FIG. 6C shows the amplitude, r, of the oscillator at the discrete time points of the computation (circles), and also connects these (solid line). FIG. 6D shows the changing frequency of the oscillator as, $f=\omega/2\pi$, at the discrete time points of the computation, and also connects these points (solid line). This illustrates that the frequency of the discrete time system comes to match the input frequency, $f_{input}=1$ Hz. Note that at the discrete time points of the computation, the result matches the result of the continuous time system (dotted lines).

By providing a network of nonlinear oscillators which behave as discussed above, a method and apparatus for more accurately provide an estimate of how frequency should change in response to the rhythm of the input signal is achieved. It is understood that modifications, variations and changes in detail can be made to the described preferred embodiments of the invention by those skilled in the art. Therefore, it is intended that all matters in the foregoing description and shown in the accompanying drawings be interpreted as illustrative and not in a limiting sense. Thus, the scope of the invention is determined by the appended claims.

What is claimed is:

1. A method for mimicking the auditory system's response to rhythm of an input signal having a time varying structure comprising the steps of:
   providing a network of m nonlinear oscillators, each oscillator of the m nonlinear oscillators having a different natural frequency of oscillation and obeying a dynamical equation of the form:

$$\dot{r} = r\left(\alpha + \beta_1|z|^2 + \epsilon\frac{\beta_2|z|^4}{1 - \epsilon|z|^2}\right) + cx(t)\frac{\cos\phi - r\sqrt{\epsilon}}{\epsilon r^2 - 2\sqrt{\epsilon}\, r\cos\phi + 1}$$

$$\dot{\phi} = \omega + \delta_1 r^2 + \epsilon\frac{\delta_2 r^4}{1 - \epsilon r^2} - cx(t)\frac{\sin(\phi)}{\epsilon r^2 - 2\sqrt{\epsilon}\, r\cos(\phi) + 1}$$

$$\dot{\omega} = -kx(t)\frac{\sin\phi}{\epsilon r^2 - 2\sqrt{\epsilon}\, r\cos\phi + 1}$$

wherein $\omega$ represents the response frequency, r is the amplitude of the oscillator and $\phi$ is the phase of the oscillator;
inputting a time varying input signal x(t) to the network of m nonlinear oscillators; and
generating at least one frequency output from said network useful for describing said varying structure.

2. A method for mimicking the auditory system's response to rhythm of an input signal having a time varying structure comprising the steps of:
providing a network of m nonlinear oscillators, each oscillator having a different natural frequency of oscillation and obeying a dynamical equation of the form:

$$r_{n+1} = \frac{1}{\sqrt{-2k_n - 2t\beta}},$$

where $k_n = -\dfrac{1}{2\left(r_n + cs_n \dfrac{(1 - \sqrt{\epsilon}\, r_n)\cos\phi_n - r_n\sqrt{\epsilon}}{\epsilon r_n^2 - 2\sqrt{\epsilon}\, r_n\cos\phi_n + 1}\right)^2}$ $$\phi_{n+1} = \phi_n + \omega T_{n+1} - cs_n \frac{(1 - \sqrt{\epsilon}\, r_n)\sin\phi_n}{\epsilon r_n^2 - 2\sqrt{\epsilon}\, r_n\cos\phi_n + 1}$$

$$\omega_{n+1} = \omega_n - ks_n \frac{(1 - \sqrt{\epsilon r_n})\sin\phi_n}{\epsilon r_n^2 - 2\sqrt{\epsilon}\, r_n\cos\phi_n + 1}$$

wherein n indexes discrete input events, $T_{n+1}$ is an inter-onset time, $s_n$ is onset strength, $\beta$ is a nonlinear dampening parameter, r is the amplitude of the oscillator, c corresponds to the strength of coupling to the external stimulus and $\phi$ is the phase of the oscillator, and $\omega$ is a resonant frequency;
receiving a discrete time input signal $s_n$ at discrete times $t_n$ at the network of m nonlinear oscillators; and
generating at least one frequency output from said network useful for describing said varying structure.

3. The method of claim 2, further comprising the steps of:
determining discrete times at which events are expected from an input stream by determining:

$$tx_{n+1} = tx_n + T_{n+1} - \frac{cs_n}{2\pi f}\frac{(1 - \sqrt{\epsilon}\, r_n)\sin\phi_n}{\epsilon r_n^2 - 2\sqrt{\epsilon}\, r_n\cos\phi_n + 1}$$

where tx is expected event time, $T_{n+1}$ is an inter-onset time, $s_n$ is onset strength, $\beta$ is a nonlinear dampening parameter, r is the amplitude of the oscillator, c corresponds to the strength of coupling to the external stimulus and $\phi$ is the phase of the oscillator; and
updating expected event time, tx, according to tx=tx 1/f when t=tx, where t is real time, and outputting musical beats when t=tx.

* * * * *